United States Patent
Rhee

(10) Patent No.: US 9,054,848 B2
(45) Date of Patent: Jun. 9, 2015

(54) ELECTRONIC APPARATUS AND ENCRYPTION METHOD THEREOF

(75) Inventor: Hyun-sook Rhee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 48 days.

(21) Appl. No.: 13/613,459

(22) Filed: Sep. 13, 2012

(65) Prior Publication Data

US 2013/0097428 A1    Apr. 18, 2013

(30) Foreign Application Priority Data

Oct. 13, 2011    (KR) .......................... 10-2011-0104820

(51) Int. Cl.
H04L 9/00    (2006.01)
H04L 9/32    (2006.01)
H04L 9/08    (2006.01)
G06F 21/62   (2013.01)

(52) U.S. Cl.
CPC .............. *H04L 9/006* (2013.01); *H04L 9/0877* (2013.01); *H04L 9/0847* (2013.01); *G06F 21/6209* (2013.01); *H04L 9/32* (2013.01)

(58) Field of Classification Search
CPC ... H04L 9/0877; H04L 9/0847; H04L 9/0841; H04L 9/0863; H04L 9/0811
USPC ....................................................... 713/183
See application file for complete search history.

(56) References Cited

U.S. PATENT DOCUMENTS

| | | | | |
|---|---|---|---|---|
| 7,484,092 B2 * | 1/2009 | Rajasekaran et al. | ......... | 713/165 |
| 8,009,829 B2 * | 8/2011 | Jueneman et al. | ............. | 380/28 |
| 8,180,047 B2 * | 5/2012 | Lauter et al. | .................... | 380/30 |
| 8,429,421 B2 * | 4/2013 | Chase et al. | .................. | 713/189 |
| 8,694,771 B2 * | 4/2014 | Malek | ............................. | 713/155 |
| 2003/0074564 A1 * | 4/2003 | Peterson | ....................... | 713/182 |
| 2004/0165728 A1 * | 8/2004 | Crane et al. | ..................... | 380/279 |
| 2004/0230540 A1 * | 11/2004 | Crane et al. | ..................... | 705/76 |
| 2005/0004924 A1 * | 1/2005 | Baldwin | ........................ | 707/100 |
| 2005/0120233 A1 * | 6/2005 | Halcrow et al. | ............... | 713/193 |
| 2008/0059787 A1 * | 3/2008 | Hohenberger et al. | ........ | 713/153 |
| 2008/0133935 A1 * | 6/2008 | Elovici et al. | ................. | 713/193 |
| 2009/0010436 A1 * | 1/2009 | Fuhr et al. | ...................... | 380/259 |
| 2009/0080650 A1 * | 3/2009 | Selgas et al. | ..................... | 380/44 |
| 2009/0204964 A1 * | 8/2009 | Foley et al. | ......................... | 718/1 |
| 2009/0210705 A1 * | 8/2009 | Chen | ................................ | 713/158 |
| 2009/0307492 A1 * | 12/2009 | Cao et al. | ........................ | 713/169 |
| 2010/0064133 A1 * | 3/2010 | Martin et al. | .................. | 713/154 |
| 2010/0082989 A1 * | 4/2010 | Bussard et al. | ................ | 713/176 |

(Continued)

OTHER PUBLICATIONS

Extended European Search Report issued in Application No. 12177538.1-2415 dated Feb. 5, 2013.

(Continued)

*Primary Examiner* — Eleni Shiferaw
*Assistant Examiner* — Nelson Scott Giddins
(74) *Attorney, Agent, or Firm* — Staas & Halsey LLP

(57) ABSTRACT

An electronic apparatus includes a secure unit to store public key information, an input unit to receive user authentication information and a data searching word, a user authenticating unit to perform user authentication with the inputted user authentication information, an encryption generating unit to generate a searching word encryption to use in data search, and a control unit to control generating the searching word encryption using the previously-stored public key information, the inputted user authentication information, and the data searching word.

19 Claims, 7 Drawing Sheets

(56) References Cited

U.S. PATENT DOCUMENTS

| | | | |
|---|---|---|---|
| 2010/0146582 A1* | 6/2010 | Jaber et al. | 726/1 |
| 2010/0153403 A1* | 6/2010 | Chang et al. | 707/747 |
| 2010/0246827 A1* | 9/2010 | Lauter et al. | 380/278 |
| 2010/0318782 A1* | 12/2010 | Auradkar et al. | 713/150 |
| 2011/0040985 A1* | 2/2011 | Tsuchiya | 713/190 |
| 2011/0119481 A1* | 5/2011 | Auradkar et al. | 713/150 |
| 2011/0145566 A1* | 6/2011 | Nice et al. | 713/155 |
| 2011/0164746 A1* | 7/2011 | Nice et al. | 380/30 |
| 2011/0173438 A1* | 7/2011 | Matzkel | 713/150 |
| 2011/0173452 A1* | 7/2011 | Nan et al. | 713/179 |
| 2011/0206200 A1* | 8/2011 | Sovio et al. | 380/30 |
| 2011/0238985 A1* | 9/2011 | Sovio et al. | 713/168 |
| 2012/0159180 A1* | 6/2012 | Chase et al. | 713/183 |
| 2012/0204032 A1* | 8/2012 | Wilkins et al. | 713/170 |
| 2013/0054968 A1* | 2/2013 | Gupta | 713/168 |
| 2013/0097428 A1* | 4/2013 | Rhee | 713/183 |
| 2013/0198522 A1* | 8/2013 | Kohno et al. | 713/182 |
| 2013/0205410 A1* | 8/2013 | Sambamurthy et al. | 726/28 |
| 2013/0287206 A1* | 10/2013 | Hattori et al. | 380/30 |
| 2014/0122900 A1* | 5/2014 | Kaushik et al. | 713/189 |

OTHER PUBLICATIONS

Qin Liu et al: "An Efficient Privacy Preserving Keyword Search Scheme in Cloud Computing", Computational Science and Engineering, 2009. CSE '09. International Conference on, IEEE, Piscataway, NJ, USA, Aug. 29, 2009, pp. 715-720, XP031544255, ISBN: 978-1-4244-5334-4.

Ming Li et al: "Authorized Private Keyword Search over Encrypted Data in Cloud Computing", Distributed Computing Systems (ICDCS), 2011 31st International Conference on, IEEE, Jun. 20, 2011, pp. 383-392, XP031904028, 001: 10.1109/ICDCS.2011.55 ISBN: 978-1-61284-384-1.

* cited by examiner

ELECTRONIC APPARATUS AND ENCRYPTION METHOD THEREOF

CROSS-REFERENCE TO RELATED APPLICATIONS

This application claims the benefit of Korean Patent Application No. 10-2011-0104820, filed on Oct. 13, 2011, in the Korean Intellectual Property Office, the disclosure of which is incorporated herein by reference in its entirety.

BACKGROUND

1. Field

Apparatuses and methods consistent with the disclosure provided herein relate to an electronic apparatus and encryption method thereof, and more particularly to an electronic apparatus performing data encryption and encryption method thereof.

2. Description of the Related Art

Under the cloud computing environment, it is possible to store and use data in several distributed storage units. Developing technologies utilizing the cloud computing environment is necessary and essential.

Electronic apparatuses connected to the network store and transmit a large volume of information, and apply current security transmission technologies such as secure sockets layers (SSL), Internet protocol security protocol (IPSec), or encryption methods to provide security. As the network has a wider scope in the cloud computing environment, electronic apparatuses storing data and transmission paths are also becoming more connected to the cloud environment. Further, user information generated, stored, and transmitted by the electronic apparatuses may be transmitted through channels affecting security in the cloud computing environment. Thus, data encryption technologies providing data privacy in various channels should basically be considered in terms of data transmitted and stored in the cloud environment and in the cloud storage units.

While conventional encryption technology provides data privacy, it lacks user convenience in terms of managing and searching data.

For instance, by utilizing scan to server, scan to e-mail, or scan to personal computer (PC) in a multiple function device, a user can process personal information through the scanning of a multi-function peripheral, and store the processed data at an S-server, an e-mail, or a PC. For the information privacy, the current technology utilizes user authentication with the identification (ID), the password (PW), and user access control to limit the access right to the storage units with the more secure channels, such as IPSec or SSL.

This technology has problems in that a user has to repeatedly set more secure channels such as IPSec or SSL using the same method to find or search information and move the data to another storage unit.

Thus, it may be particularly inefficient and difficult under a cloud computing environment which requires frequent communication, such as moving freely between storage units, i.e., storing data in a more secure storage unit, setting secure channels in every session and implementing access control to storage units.

A searchable query encryption method, first suggested by Song et al. (2000), has been increasingly studied, about searching queries such as equality, range, subset and inner product in encrypted data. However, in addition to the obstacles barring actual implementation of the technology to practical use, this method also has problems in managing and utilizing symmetric encryption keys such as a secret key or an asymmetric decryption key such as a private key.

SUMMARY OF THE INVENTION

The present general inventive concept provides an apparatus and method of managing data and controlling information on the data.

Additional features and utilities of the present general inventive concept will be set forth in part in the description which follows and, in part, will be obvious from the description, or may be learned by practice of the general inventive concept.

The foregoing and/or features and utilities of the present general inventive concept may be achieved by an electronic apparatus which manages a public key and a private key applied readily to encryption and an encryption method thereof.

The foregoing and/or features and utilities of the present general inventive concept may be achieved by an electronic apparatus that may include a secure unit which stores public key information, an input unit which receives user authentication information and a data searching word, a user authenticating unit which performs user authentication with the inputted user authentication information, an encryption generating unit which generates a searching word encryption to use in data search, and a control unit which controls so that the searching word encryption is generated using the previously-stored public key information, the inputted user authentication information, and the data searching word.

The secure unit may additionally include private key information and a query generating unit which generates a searching word query if the data searching word is inputted, to search the searching word encryption corresponding to the inputted searching word using the private key information, the inputted user authentication information, and the searching word.

The electronic apparatus may additionally include a data searching unit which searches encrypted data using the generated searching word query, and the control unit controls so that the generated searching word query is compared with the previously-stored searching word encryption, and the corresponding encrypted data is searched.

The user authentication information may include an identification (ID) and a password of a user, and the encryption generating unit generates the searching word encryption using the previously-stored public key information, the inputted password, and the searching word.

The user authentication information may include an identification (ID) and a password of a user, and the query generating unit generates the searching word query using the public key information, the inputted password, and the searching word.

The encrypted data may be stored in an internal memory or in an external data server.

The secure unit may be implemented as a smart card or as a trusted platform module (TPM).

The electronic apparatus may perform encryption using identity-based encryption (IBE).

The foregoing and/or features and utilities of the present general inventive concept may be achieved by an encryption method of an electronic apparatus that may include inputting user authentication information and a data searching word, performing user authentication with the inputted user authentication information, and generating a searching word encryption using the inputted user authentication information, a data searching word, and previously-stored public key information.

The encryption method may additionally include generating a searching word query to search the searching word encryption corresponding to the inputted searching word using previously-stored private key information, the inputted user authentication information, and a searching word.

The encryption method may additionally include comparing the generated searching word query with the previously-stored searching word encryption and searching the corresponding encrypted data.

The user authentication information may include an identification (ID) and a password of a user, and the generating of the searching word encryption may include generating the searching word encryption using the previously-stored public key information, the inputted password, and the searching word.

The user authentication information may include an identification (ID) and a password of a user, and the generating of the searching word query may include generating the searching word query using the public key information, the inputted password, and the searching word.

The encrypted data may be stored in an internal memory or in an external data server.

At least one of the public key and the private key may be stored in a smart card or a trusted platform module (TPM).

The electronic apparatus may perform encryption using identity-based encryption (IBE).

The foregoing and/or features and utilities of the present general inventive concept may be achieved by a recording medium storing therein a program to implement an encryption method of an electronic apparatus, wherein the encryption method may include inputting user authentication information and a data searching word, performing user authentication with the inputted user authentication information, and generating a searching word encryption using the inputted user authentication information, the data searching word, and the previously-stored public key information.

The encryption method may additionally include generating a searching query to search the searching word encryption corresponding to the inputted searching word using the previously-stored private key information, the inputted user authentication information, and the searching word.

The encryption method may additionally include comparing the generated searching word query with the previously-stored searching word encryption, and searching the corresponding encrypted data.

The electronic apparatus may perform encryption using identity-based encryption (IBE).

BRIEF DESCRIPTIONS OF THE DRAWINGS

These and/or other features and utilities of the present general inventive concept will become apparent and more readily appreciated from the following description of the embodiments, taken in conjunction with the accompanying drawings of which:

DETAILED DESCRIPTION OF THE PREFERRED EMBODIMENTS

Figure 1:
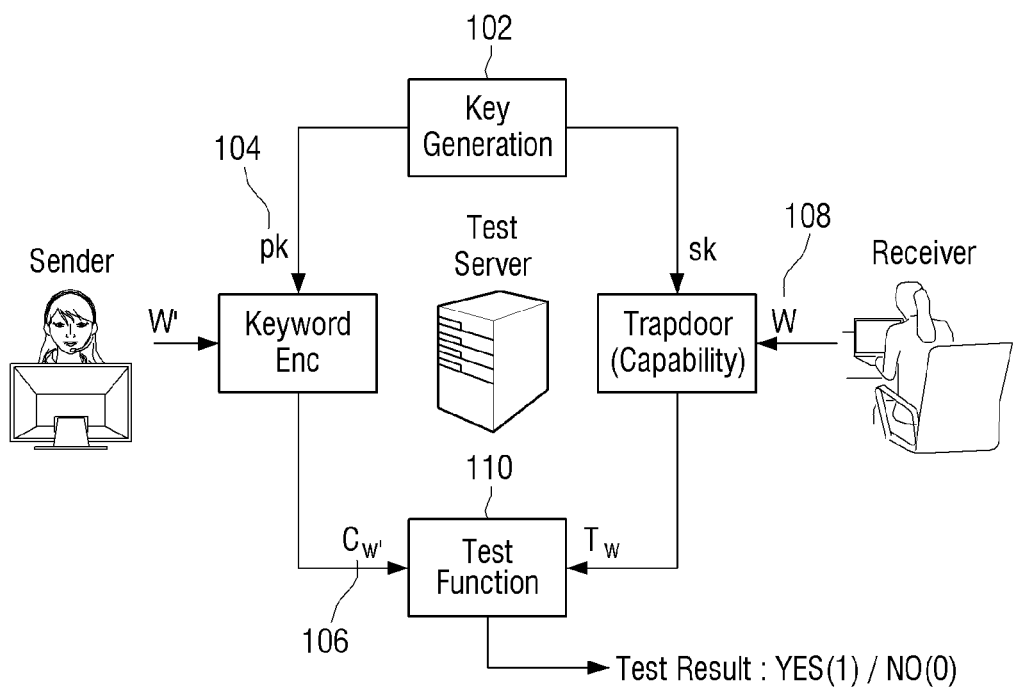
FIG. 1 is a diagram illustrating an encryption method according to an embodiment of the present general inventive concept.

Certain exemplary embodiments of the present inventive concept will now be described in greater detail with reference to the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The matters defined in the description, such as detailed construction and elements, are provided to assist in a comprehensive understanding of the present inventive concept. Accordingly, it is apparent that the exemplary embodiments of the present inventive concept may be carried out without those specifically defined matters. Also, well-known functions or constructions are not described in detail since they would obscure the invention with unnecessary detail.

FIG. 1 is a diagram illustrating an encryption method according to an embodiment of the present general inventive concept.

Referring to the identity-based encryption (IBE) illustrated in FIG. 1, a user may utilize user information as a public key. Information to be utilized as a public key may be limited to the user's own information such as an email address or a telephone number. A public key encryption method has an advantage in which users who previously do not share a key may enjoy data communication safely. However, the others communicating with the user need a method to check whether the public key is directed to the user only. Usually, a public key infrastructure such as electric authentication is recommended even though it costs time and money. The IBE removes the above checking process because it utilizes the others' identification as a public key.

Encryption may proceed based on the IBE in which a user may select the public key freely. The trusted third party (Key Generation 102), in other words, the authority, generates a private key (pk, 104) corresponding to a user's identity by utilizing the master secret key (MSK) that only the authority knows, and gives the private key to the user safely.

Using the user's open identity, a message M is encrypted, and thus, an encryption C ($C_W$, 106) is generated. A user having a private key corresponding to the open identity may exclusively have the message M from the encryption C. The structure of IBE is as follows:

The identity-based encryption scheme IBE equals to (Setup_IBE, KeyDer_IBE, Enc_IBE or Dec_IBE) while consisting of the following four algorithms.

Setup_IBE (k): takes as input security parameter k, and outputs public parameters PP and master secret key msk.

KeyDer_IBE (PP, msk, ID): takes as input PP, msk, and an arbitrary identity ID. It outputs private key d_ID corresponding to identity ID.

Enc_IBE (PP, ID, M): takes as input PP, ID, and M. It outputs ciphertext C.

Dec_IBE (PP, ID, C, d_ID) takes as input PP, ID, C, and private key d_ID. It outputs either M or a symbol null indicating a failure.

As usual, this algorithm must satisfy the correctness constraint, that is, for every M and all identity ID, if the corresponding private key of ID is d_ID←KeyDri_IBE (PP, msk, ID), then we have Dec_IBE (PP, ID, Enc_IBE (PP, ID, M), d_ID)=M, with probability one, where the probability is taken over the coins of Enc_IBE.

In one embodiment, an encryption system is proposed, which utilizes the IBE as defined above to connect to a variety of electronic apparatuses.

In one embodiment, the user information processed at an electronic apparatus 100 is encrypted and stored in an encrypted data storage medium, and the storage position of the encrypted information is memorized.

Then, using the searching word W provided by a user having authentication and a password (PW) provided by a user authenticating unit, a searching word encryption CT is generated, added with the storage position of the data encryption corresponding to the CT, and stored and managed.

If an authenticated user inputs the searching word W (108) after authentication, the electronic apparatus 100 may generate a searching query d_(PW, w) regarding (PW, w). The electronic apparatus 100 may utilize the generated d_(PW, w) and the searching word encryption CT on a stored list, perform a test function (110) to obtain the position information of the cloud storage, and provide corresponding information to the user.

Figure 2:
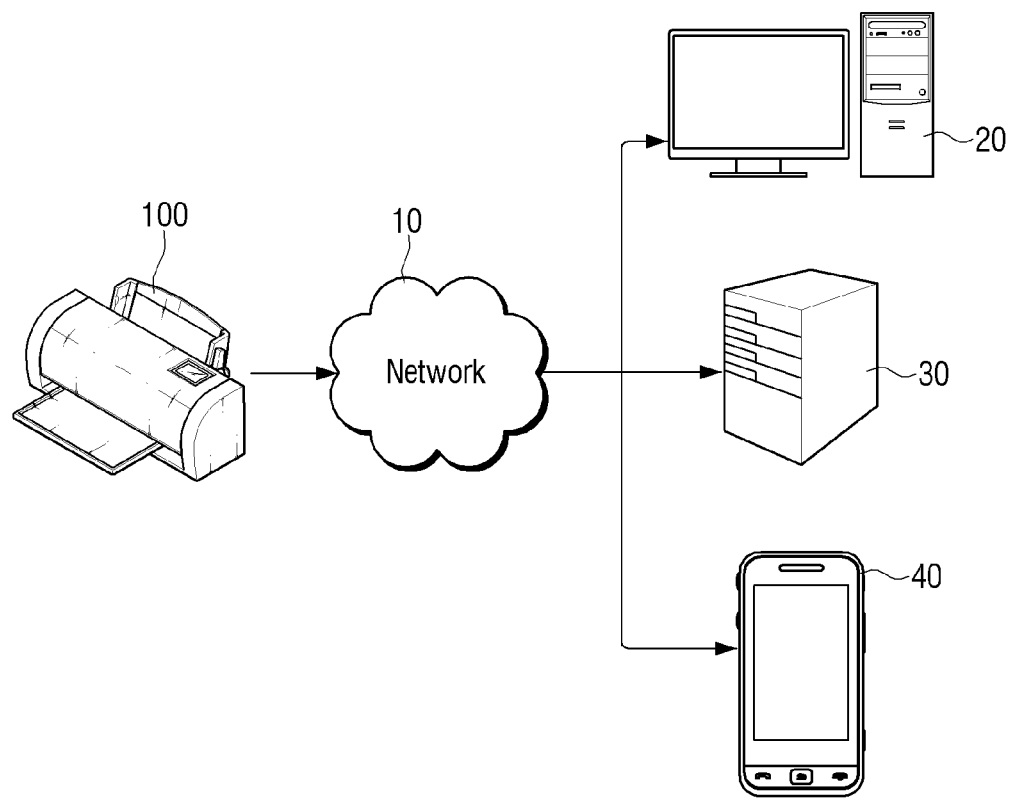
FIG. 2 is a diagram illustrating an encryption system according to an embodiment.

FIG. 2 is a diagram illustrating an encryption system according to an embodiment of the present general inventive concept.

Referring to FIG. 2, an electronic apparatus 100, though not limited to the illustrated image forming device, may be connected to at least one of a PC 20, a server 30, and a smartphone 40 through a network 10.

The electronic apparatus 100 may search the encrypted data stored in external data servers of the PC 20, a server 30, and a smartphone 40, and may find the information.

Figure 3A:
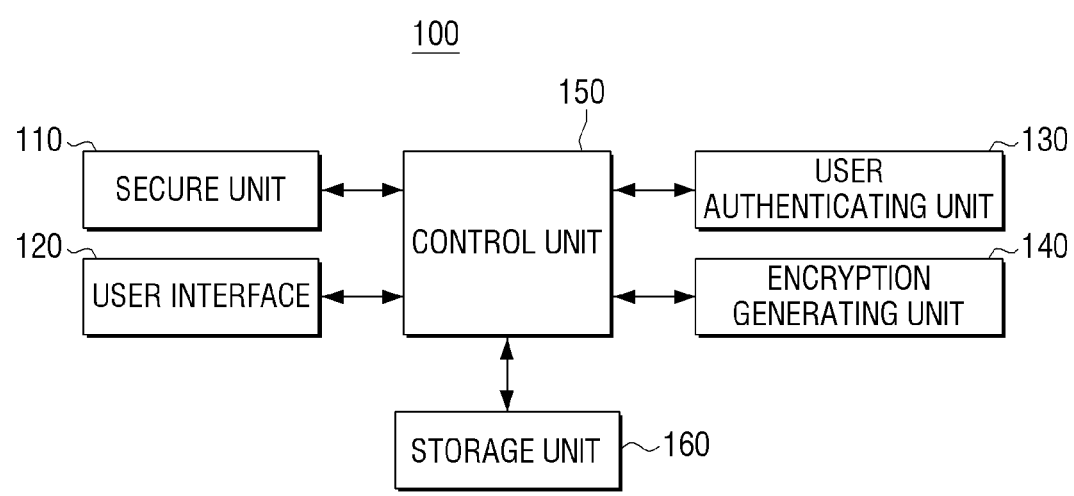
FIGS. 3A and 3B are block diagrams illustrating an electronic apparatus according to an embodiment of the present general inventive concept.
Figure 3B:
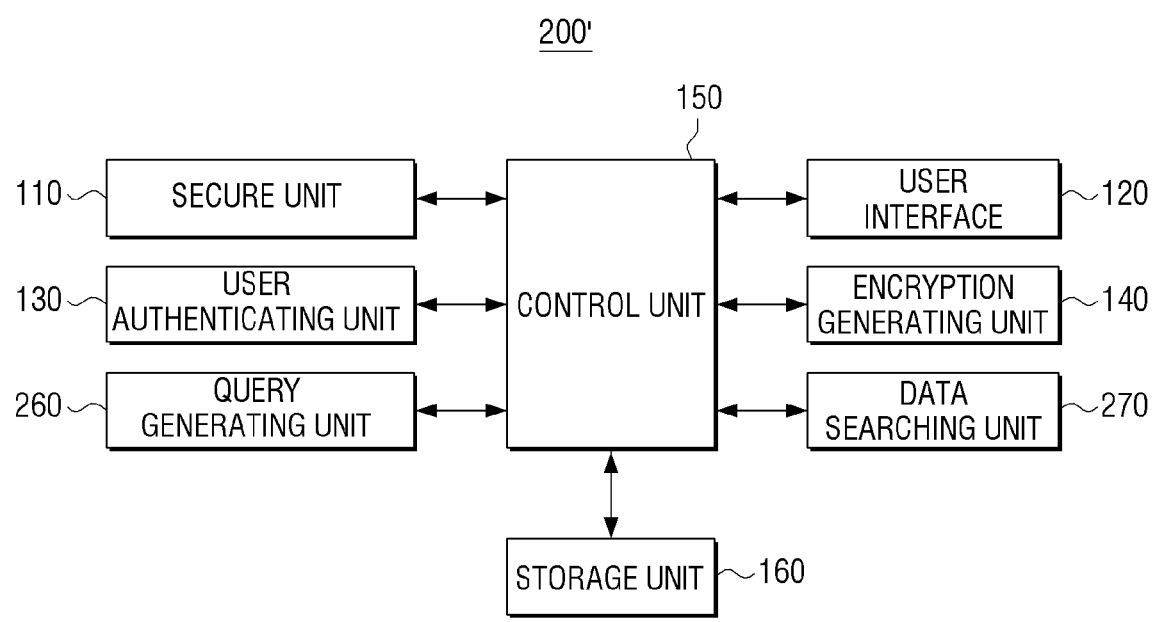

FIGS. 3A and 3B are block diagrams illustrating the electronic apparatus according to an embodiment of the present general inventive concept.

Referring to FIG. 3A, the electronic apparatus 100 may include a secure unit 110, a user interface (UI) 120, a user authenticating unit 130, an encryption generating unit 140, a control unit 150, and a storage unit 160.

The electronic apparatus 100 may be implemented as a printer, a scanner, a copying machine, a facsimile apparatus or a multi-function peripheral apparatus having at least two functions of a printer, a scanner, a copying machine, and a facsimile apparatus. Further, the electronic apparatus 100 may be implemented as a smart television, a smartphone, or a personal computer that may support data searching.

The secure unit 110 may store the public key (PK). The PK information may correspond to the PP of the IBE.

The secure unit 110 may be implemented as a temper-resistant device, for instance, a smart card, or as both a temper-resistant and an advanced-calculating trusted platform module (TPM).

The secure unit 110 may perform at least one function of generating, storing, and managing the public key. For instance, the secure unit 110 may generate, store and manage the public key, and may store and manage the public key received from external devices.

The user interface 120 may receive various user orders to control the electronic apparatus 100.

The user interface 120 may be implemented as an input panel including a user manipulation key (not illustrated herein). The user interface 120 also may be implemented as a touch pad including both input and output. Further, if the electronic apparatus 100 is an image forming apparatus, the user interface 120 may include a display such as liquid crystal display (LCD) to show the status of the image forming apparatus. The user interface 120 also may display information provided by the image forming apparatus and the progress or the result of job processing at the image forming apparatus. The user may find and control the progress of the various print jobs at the image forming apparatus through the user interface 120.

The user interface 120 may receive input of searching word W to search the user authentication information and data. The user authentication information herein may include the user ID and the PW. The user ID may be an email address, a telephone number, or the like. The searching word to search the data may be encrypted within an internal storage, an external storage, or an external data server, and may be a searching keyword to search the stored data.

Meanwhile, the user interface 120 may receive user orders inputted from web user interface (web UI), not from the input within the electronic apparatus 100. In other words, the user interface 120 may receive user orders such as searching words or user authentication information from the web.

The user authenticating unit 130 may authenticate user information inputted from the user interface 120, such as the user ID and the PW.

The encryption generating unit 140 may generate a searching word encryption to be used in data searching. The encryption generating unit 140 may utilize the public key previously stored in the secure unit 110 controlled by the control unit 150 and the searching word W inputted from the user interface 120, and may generate the searching word encryption corresponding to the searching word W. The user authentication information utilized in the encryption generating unit 140 may be the PW.

The control unit 150 may control the overall operation of the electronic apparatus 100.

The control unit 150 may control the encryption generating unit 140 to generate the searching word encryption corresponding to the searching word W by utilizing the public key previously stored in the secure unit 110, the user authentication information inputted from the user interface 120, and the searching word W.

The searching word encryption generated from the encryption generating unit 140 may be stored in the storage unit 170. The storage unit 170 may be implemented as an internal storage device within the electronic apparatus 100.

Alternatively, the searching word encryption may be stored in external storage medium such as a removable disk including a universal serial bus (USB) memory, a storage device connected to the host, a web server connected through the network, or a cloud server.

Referring to FIG. 3B, the electronic apparatus 200 may include a secure unit 110, a user interface 120, a user authenticating unit 130, an encryption generating unit 140, a control unit 150, a query generating unit 260 and a data searching unit 270. The units also illustrated in FIG. 3A are briefly described below for the sake of brevity.

The secure unit 110 may include a secret key (SK) as well as the public key. The secure unit 110 may generate a pair of the public key and the secret key (PK, SK) corresponding to the electronic apparatus 100,200, and store the pair.

If a searching word is inputted from the user interface 120 the query generating unit 260 may generate the searching word query to searching encryptions corresponding to the inputted searching word. Referring to FIG. 3A, the searching word encryption may previously be stored in the storage unit 160 of the electronic apparatus or external storage medium.

The query generating unit 260 may utilize the public key stored in the storage unit 160 the user authentication information inputted from the user interface 120 and the searching word, and may generate the searching word query. The user authentication information may be the PW.

The data searching unit 270 may search data encrypted by utilizing the searching word query generated from the query generating unit 260. The encrypted data may be stored in the storage unit 160 within the electronic apparatus 100, 200 or the external storage medium. The searching word encryption and the encrypted data may be stored in one storage unit, or in separate storage units. For instance, the searching word encryption may be stored in the storage unit 160 within the electronic apparatus 100, 200 and the encrypted data may be stored in the external storage medium.

Although not illustrated herein, the electronic apparatus 100 may further include a content input which receives data contents, a data generator which generates the encoded data, and a data encryption generating unit which generates data encryption corresponding to the generated data. The generated data may be stored in the storage unit 160 within the electronic apparatus 100 or in the external storage medium.

For instance, if the electronic apparatus 100, 200 is implemented as a multi-function peripheral (MFP) apparatus, the content input may receive the printable contents, scanable contents, copyable contents, faxable contents, or other contents.

Inputting and generating data may be performed in the external data server as well as in the electronic apparatus 100, 200 and the encrypted data may be stored in the external data server.

Even though generating the searching word encryption and generating the searching word query are explained as successive steps with reference to FIGS. 3A and 3B, the two generating steps are two separate operations. Accordingly, the user may select between generating the encryption and generating the query when the user authentication information and the searching word are inputted.

Figure 4:
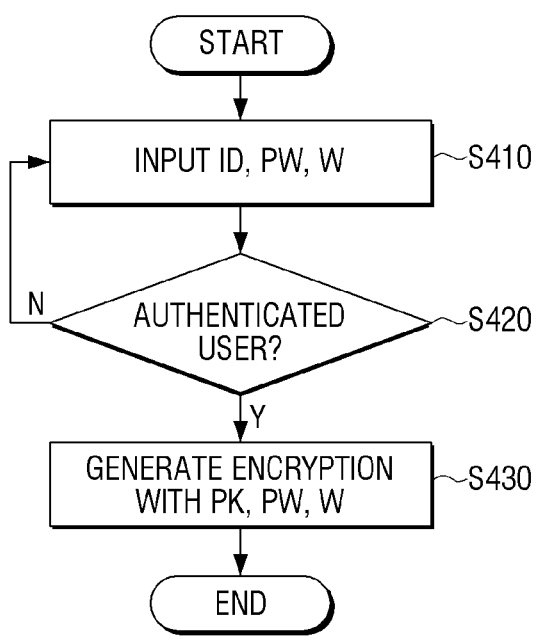
FIG. 4 is a flowchart provided to explain a method to generate a searching word encryption according to an embodiment of the present general inventive concept.
Figure 5:
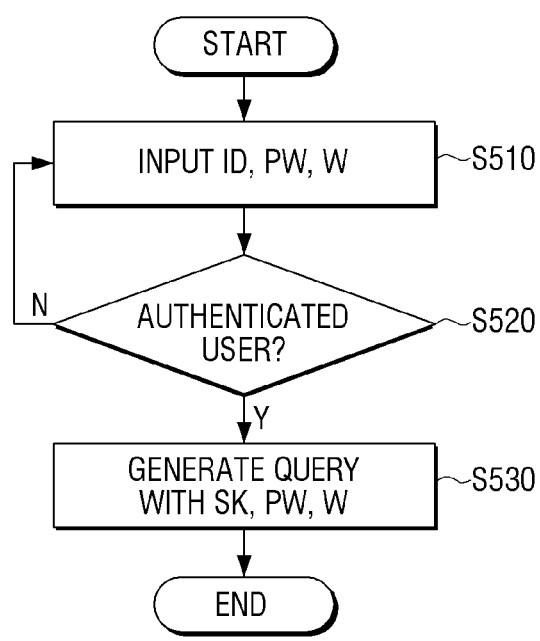
FIG. 5 is a flowchart provided to explain a method to generate a searching word query according to an embodiment of the present general inventive concept.
Figure 6:
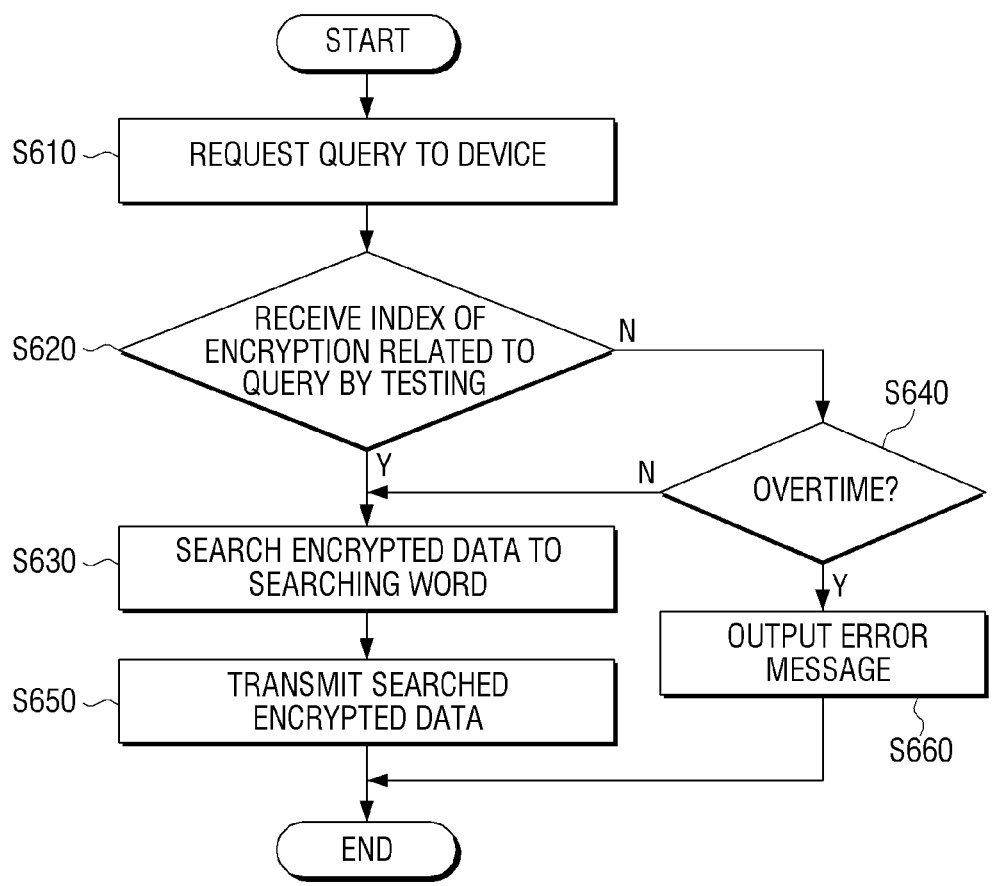
FIG. 6 is a flowchart provided to explain a data searching method according to an embodiment of the present general inventive concept.

Referring to FIGS. 4 to 6, generating the searching word encryption, generating the searching word query, and searching data by utilizing the encryption and the query will be described in detail below. Hereinbelow, it is assumed that the electronic apparatus 100 utilizes the temper-resistant and calculating TPM chip, and generates and stores the pair of the public key of the device and the secret key (PK, SK).

FIG. 4 is a flowchart illustrating a searching word encryption generating method according to an embodiment of the present general inventive concept.

Referring to FIG. 4, the encryption generating method may start from inputting the user authentication information such as the ID, the PW, and the searching word W to search data at operation S410. At operation S420, it is determined whether the user is an authenticated user based on the user authentication information such as the ID and the PW.

If determining the authenticated user at operation S420 is Yes (Y), at operation S430, the searching word encryption CT=(R, C) is generated and stored by utilizing the PK previously stored in the TPM, the PW, and the searching word W.

The PK of the electronic apparatus 100, 200 may correspond to the PP of the IBE, the (PW, w) may correspond to the identity of the IBE, and the IBE encryption, C=Enc_IBE (PK, PW, w, R) may be generated regarding a random message, R by utilizing IBE. Further, the searching word encryption, CT=(R, C) may be generated.

The generated and stored searching word encryption may be utilized in searching data. If the electronic apparatus 100, 200 itself performs a test in one of the later steps, opening the PK or authentication of the PK may not be requested. In addition, if another agent performs a test, the electronic apparatus 100, 200 may not request the authentication of the PK.

FIG. 5 is a flowchart illustrating a searching word query generating method according to an embodiment.

Referring to FIG. 5, at operation S510, if the user authentication information such as the ID or the PW, and the searching word W to be utilized to search data are inputted, at operation S520, it is determined whether the user is an authenticated user based on the user authentication information such as the ID and the PW. At operation S530, a query is generated with SK, PW, and W.

The SK may correspond to a master secret key of the IBE, the (PW, w) may correspond to the identity of the IBE, and d_(PW, w)=KeyDer_IBE (PP, SK, PW, w) regarding the (PW, w) may be generated by utilizing the IBE. The generated d_(PW, w) may be replaced with the searching word query.

Searching the encrypted data may be performed by utilizing the generated searching word query.

The searching word encryption generating method and the searching word query generating method in FIG. 4 relate to two separate operations. If the user authentication information and the searching word are inputted, a user may select one of the above generating methods.

FIG. 6 is a flowchart illustrating a data searching method according to an embodiment of the present general inventive concept.

The data searching method in FIG. 6 may proceed after generating of the searching word query in FIG. 5.

Referring to FIG. 6, if the generated query in FIG. 5 is requested at operation S610, at S620, an index of the searching word encryption related with the searching word query may be received. The searching word encryption CT, in which the Enc_IBE (PP, PW, w, C, d_{PW, w})=R, may be searched by utilizing the searching word query (d_(PW, w)), and the previously stored searching word encryption (CT=(R, C)), and the index added with the searched encryption may be provided.

If the index of the searching word encryption related with the searching word query is received at operation S620—Y, the data corresponding to the received index may be searched in the previously encrypted data at operation S630.

At operation S650, the data searched at operation S630 may be provided to the user after encrypting or descrambling. Providing data may be different according to functions of the electronic apparatus 100, 200. For instance, if the electronic apparatus 100, 200 is MFP, printing, attaching data to an email or sending a facsimile may be utilized to provide data to the user.

At operation S640—Y, if the index of the searching word encryption related to the searching word query is not received within a predetermined time D, an error message may be outputted at S660. At operation S640—N, if the index of the searching word encryption related to the searching word query is received within the predetermined time D, the system proceeds to S630 (described above).

Because data is encrypted and stored in the invention, an additional encryption module such as the SSL or the IPSec may not be requested in transmitting.

Further, difficulties in managing the public key and the secret key per user, which other encryption methods employ, may be resolved, and the authentication of the public key regarding the user and the electronic apparatus may not be requested.

As managing data processed in the electronic apparatus is provided to each user or each data unit, the user may manage the data more efficiently and may control his information.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
    a secure unit to store public key information;
    an input unit to receive user authentication information and a data searching word;
    a user authenticating unit to perform user authentication with the inputted user authentication information;
    an encryption generating unit to generate a searching word encryption for use in data search according to a random message and an encryption, where the encryption is determined according to the stored public key, the inputted user information, the random message, and the data searching word when the user has been authenticated by the user authentication unit according to the inputted user authentication information; and
    a control unit to control generating the searching word encryption using the previously-stored public key information, the inputted user authentication information, and the data searching word,
    wherein the secure unit is implemented as a trusted platform module (TPM), and
    wherein the TPM generates a pair of the public key information of the electronic apparatus and secret key information of the electronic apparatus and stores the pair in the secure unit.

2. The electronic apparatus of claim 1, wherein the secure unit further comprises:
    a query generating unit to generate a searching word query, when the data searching word is inputted, to search the searching word encryption corresponding to the inputted data searching word using the secret key information, the inputted user authentication information, and the data searching word.

3. The electronic apparatus of claim 2, further comprising:
    a data searching unit to search encrypted data using the generated searching word query, and
    the control unit to control comparing the generated searching word query with the searching word encryption and searching corresponding encrypted data.

4. The electronic apparatus of claim 1, wherein the user authentication information comprises an identification (ID) and a password of a user, and the encryption generating unit generates the searching word encryption using the stored public key information, the inputted password and the data searching word.

5. The electronic apparatus of claim 2, wherein the user authentication information comprises an identification (ID) and a password of a user, and the query generating unit generates the searching word query using the public key information, the inputted password and the data searching word.

6. The electronic apparatus of claim 1, wherein the encrypted data is stored in one of: an internal memory and an external data server.

7. The electronic apparatus of claim 1, wherein the electronic apparatus performs encryption using identity-based encryption (IBE).

8. An encryption method of an electronic apparatus, the method comprising:
    inputting user authentication information and a data searching word;
    performing user authentication with the inputted user authentication information;
    generating a searching word encryption according to a random message and an encryption, where the encryption uses the inputted user authentication information, the data searching word, the random message, and previously-stored public key information when the user has been authenticated according to the inputted user authentication information; and
    generating a searching word query to search the searching word encryption corresponding to the inputted data searching word using previously-stored private key information, the inputted user authentication information, and the data searching word,
    wherein a pair of the public key information and secret key information are generated by a trusted platform module (TPM) and are stored in the TPM.

9. The encryption method of claim 8, further comprising comparing the generated searching word query with the previously-stored searching word encryption and searching corresponding encrypted data.

10. The encryption method of claim 8, wherein the user authentication information comprises an identification (ID) and a password of a user, and the generating of the searching word encryption comprises generating the searching word encryption using the previously-stored public key information, the inputted password, and the data searching word.

11. The encryption method of claim 8, wherein the user authentication information comprises an identification (ID) and a password of a user, and the generating of the searching word query comprises generating the searching word query using the previously-stored public key information, the inputted password, and the data searching word.

12. The encryption method of claim 8, wherein the encrypted data is stored in one of:
    an internal memory and an external data server.

13. The encryption method of claim 8, wherein the electronic apparatus performs encryption using identity-based encryption (IBE).

14. A non-transitory computer readable medium storing therein a program to implement an encryption method of an electronic apparatus, wherein the encryption method comprises:
- inputting user authentication information and a data searching word;
- performing user authentication with the inputted user authentication information; and
- generating a searching word encryption according to a random message and an encryption, where the encryption uses the inputted user authentication information, the data searching word, the random message, and previously-stored public key information when the user has been authenticated according to the inputted user authentication information,
- wherein a pair of the public key information of the electronic apparatus and secret key information of the electronic apparatus are generated by a trusted platform module (TPM) and are stored in the TPM.

15. The recording medium of claim 14, wherein the encryption method further comprises generating a searching query to search the searching word encryption corresponding to the inputted searching word using the secret key information, the inputted user authentication information, and the data searching word.

16. The recording medium of claim 15, wherein the encryption method further comprises comparing the generated searching word query with the previously-stored searching word encryption and searching corresponding encrypted data.

17. The recording medium of claim 14, wherein the electronic apparatus performs encryption using identity-based encryption (IBE).

18. An encryption method of an electronic apparatus, the method comprising:
- encrypting and storing user information in an encrypted medium;
- authenticating a user, and generating a user password;
- generating, using a searching word provided by the authenticated user, the user password and previously-stored public key information, a searching word encryption of a message together with a storage position of data encryption corresponding to the searching word encryption, the searching word encryption being generated according to a random message and an encryption, where the encryption is determined according to the previously-stored public key information, inputted user information to authenticate the user, the random message, and the searching word when the user has been authenticated;
- generating in response to user input of the searching word after user authentication, a searching query with respect to the password and the searching word and previously-stored secret key information;
- performing a test function utilizing a searching query result and the searching word encryption to obtain storage position information of the encrypted message; and
- decrypting the encrypted message,
- wherein a pair of the public key information and the secret key information are generated by a trusted platform module (TPM) and are stored in the TPM.

19. An encryption method of an electronic apparatus, the method comprising:
- encrypting and storing user information in an encrypted medium;
- authenticating a user, and generating a user password; and
- generating using a searching word provided by the authenticated user, the user password and previously-stored public key information, a searching word encryption of a message together with a storage position of data encryption corresponding to the searching word encryption, the searching word encryption being generated according to a random message and an encryption, where the encryption is determined according to the previously-stored public key information, inputted user information to authenticate the user, the random message, and the searching word when the user has been authenticated,
- wherein a pair of the public key information of the electronic apparatus and a secret key information of the electronic apparatus are generated by a trusted platform module (TPM) and are stored in the TPM.

* * * * *